United States Patent
Klaghofer et al.

(10) Patent No.: US 10,382,402 B2
(45) Date of Patent: Aug. 13, 2019

(54) TELECOMMUNICATION SYSTEM AND METHOD FOR TRAVERSING AN APPLICATION LAYER GATEWAY FIREWALL DURING THE ESTABLISHMENT OF AN RTC COMMUNICATION CONNECTION BETWEEN AN RTC CLIENT AND AN RTC SERVER

(71) Applicant: Unify GmbH & Co. KG, Munich (DE)

(72) Inventors: Karl Klaghofer, München (DE); Thomas Stach, Vienna (AT); Jürgen Totzke, Poing (DE)

(73) Assignee: Unify GmbH & Co. KG, Munich (DE)

( * ) Notice: Subject to any disclaimer, the term of this patent is extended or adjusted under 35 U.S.C. 154(b) by 150 days.

(21) Appl. No.: 15/519,411

(22) PCT Filed: Oct. 15, 2015

(86) PCT No.: PCT/EP2015/002040
§ 371 (c)(1),
(2) Date: Apr. 14, 2017

(87) PCT Pub. No.: WO2016/062387
PCT Pub. Date: Apr. 28, 2016

(65) Prior Publication Data
US 2017/0237708 A1    Aug. 17, 2017

(30) Foreign Application Priority Data
Oct. 21, 2014    (DE) .................. 10 2014 015 443

(51) Int. Cl.
*H04L 29/06* (2006.01)
*H04L 29/08* (2006.01)

(52) U.S. Cl.
CPC ........ *H04L 63/029* (2013.01); *H04L 65/1069* (2013.01); *H04L 65/608* (2013.01); *H04L 67/02* (2013.01); *H04L 67/42* (2013.01)

(58) Field of Classification Search
CPC .... H04L 63/029; H04L 65/069; H04L 65/608
See application file for complete search history.

(56) References Cited

U.S. PATENT DOCUMENTS

| 7,570,765 B1 | 8/2009 | Eslambolchizadeh |
| 8,695,077 B1 * | 4/2014 | Gerhard .............. H04L 63/0815 726/8 |

(Continued)

FOREIGN PATENT DOCUMENTS

| CN | 103929438 A | 7/2014 |
| JP | 2006053799 A | 2/2006 |
| WO | 2011021865 A2 | 2/2011 |

OTHER PUBLICATIONS

Japanese Office Action dated Oct. 2, 2017 for Japanese Patent Application No. 2017-522046 (German Translation).

(Continued)

*Primary Examiner* — Dao Q Ho
(74) *Attorney, Agent, or Firm* — Buchanan Ingersoll & Rooney PC

(57) ABSTRACT

The invention relates to a telecommunications assembly (10) and a method for traversing an application layer gateway firewall (40) during the establishment of an RTC communication connection between an RTC client (20) and an RTC server (30) using a proprietary RTC signalling protocol, wherein the firewall (40) has no specific knowledge of the proprietary RTC signalling protocol. The method comprises the following steps: the RTC client (20) and the RTC server (30) negotiate during the establishment of the RTC communication connection which of the ports (P1, P2, P3) of the firewall (40) are required for the data packets to be (Continued)

exchanged via the RTC communication connection, wherein they use at least one standardized message element as a component of the proprietary RTC signalling protocol, with which information relating to the ports to be used can be found; during the establishment of the RTC communication connection the firewall (40) detects, with the aid of the standardized message element, which of the ports (P1, P2, P3) of the firewall (40) are considered by the RTC client (20) and the RTC server (30) to be necessary for the data packets to be exchanged via the RTC communication connection; and the firewall (40) opens and closes the required ports (P1, P2, P3) in a dynamic manner according to the result of the negotiation.

18 Claims, 5 Drawing Sheets

(56) References Cited

U.S. PATENT DOCUMENTS

| | | |
|---|---|---|
| 2003/0204608 A1 | 10/2003 | Isomaki |
| 2011/0047253 A1 | 2/2011 | Bhat |
| 2015/0127759 A1* | 5/2015 | Siegel .................... H04L 51/26 709/207 |

OTHER PUBLICATIONS

Yasuhiro Kawai, "Vermehrte Nutzung von IP-Telefone in Unternehmen, ist die Sicherheit Gewahrleistet?", Nikkei Internet Solutions, No. 75, JP, Nikkei Business Publications, Inc. Oct. 2003.

German Office Action dated Oct. 5, 2015 for German Patent Application Serial No. 10 2014 015 443.2.

"webRTC", Wikipedia dated Oct. 2, 2015, https://de.wikipedia.org/wiki/WebRTC.

International Preliminary Report on Patentability dated Apr. 25, 2017 (English Translation).

* cited by examiner

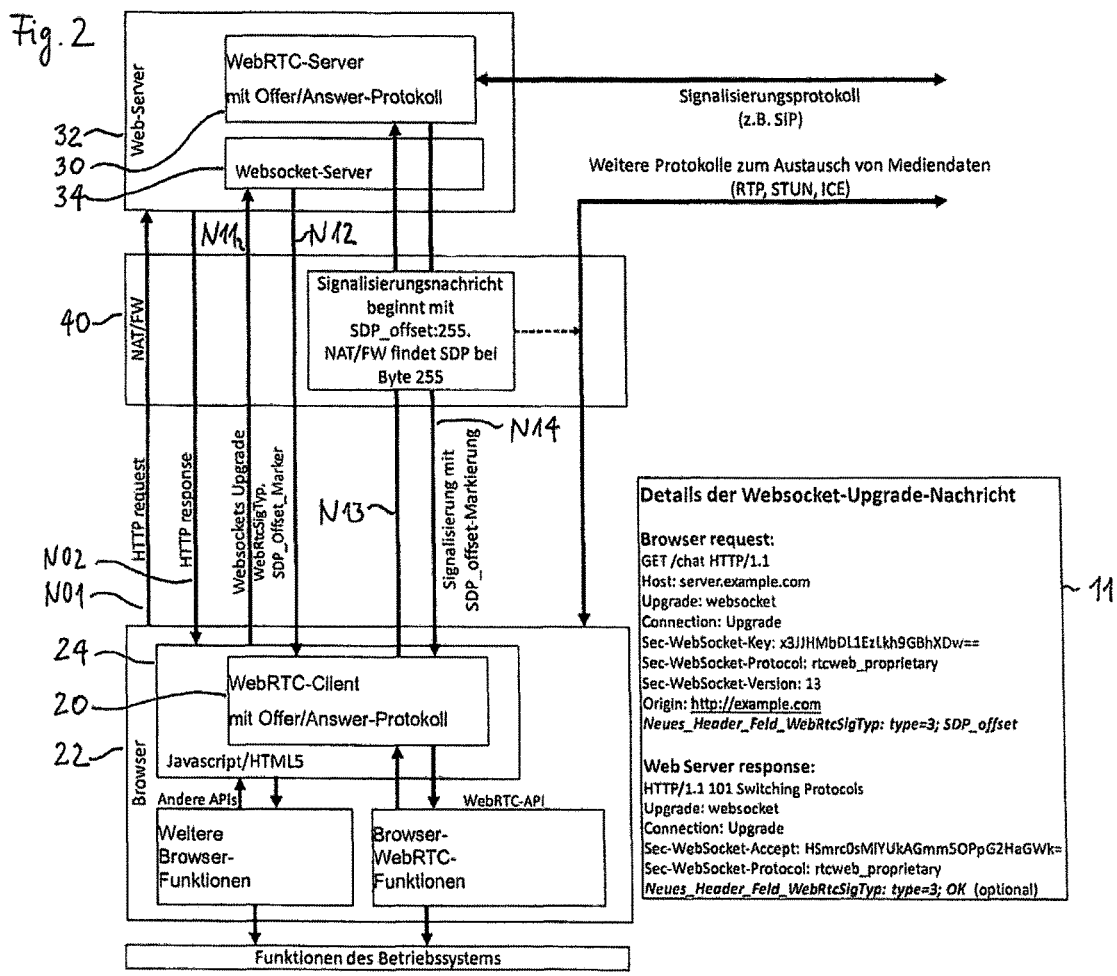

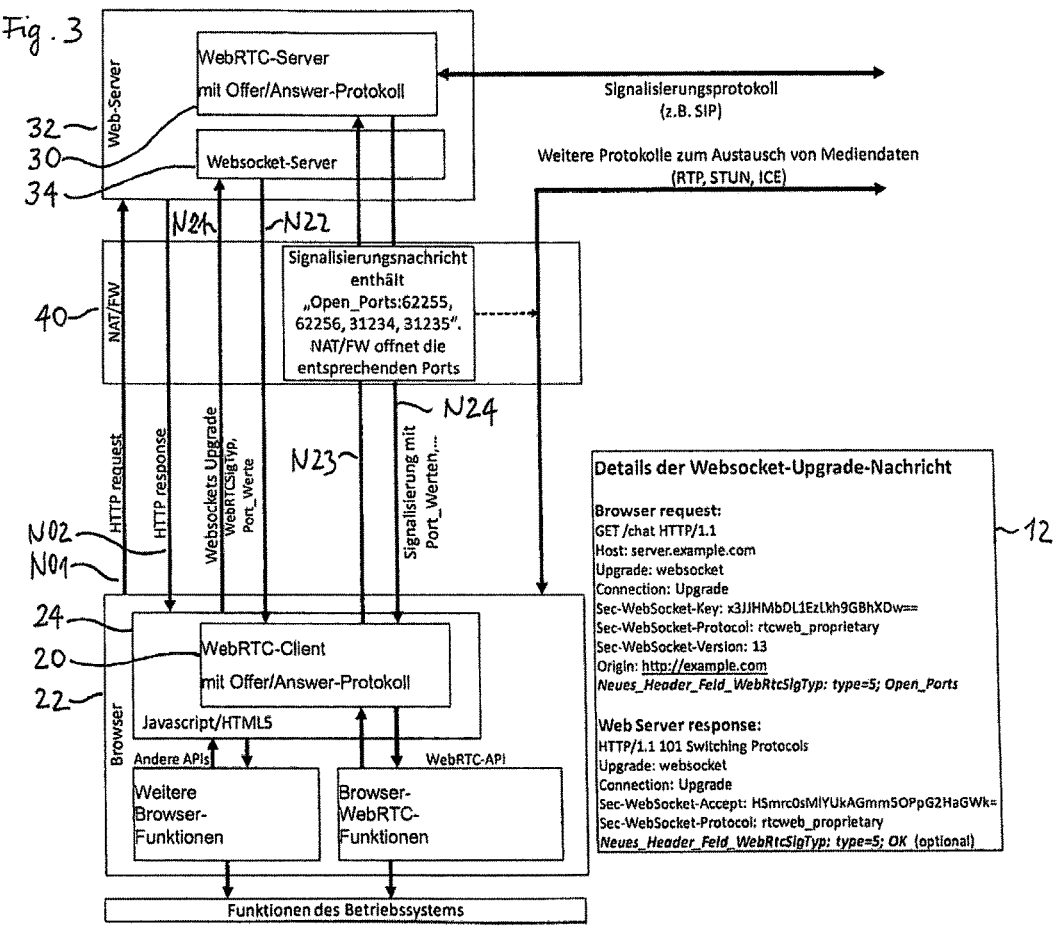

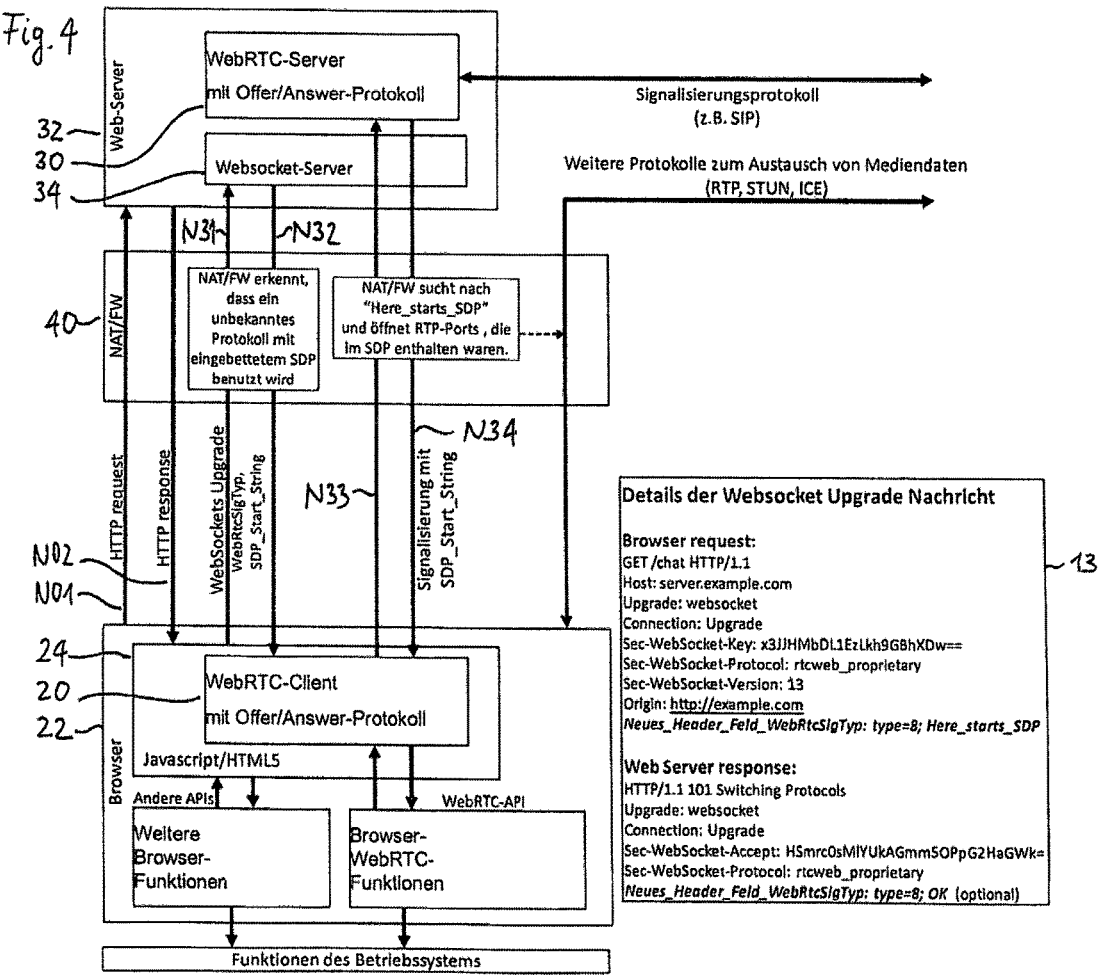

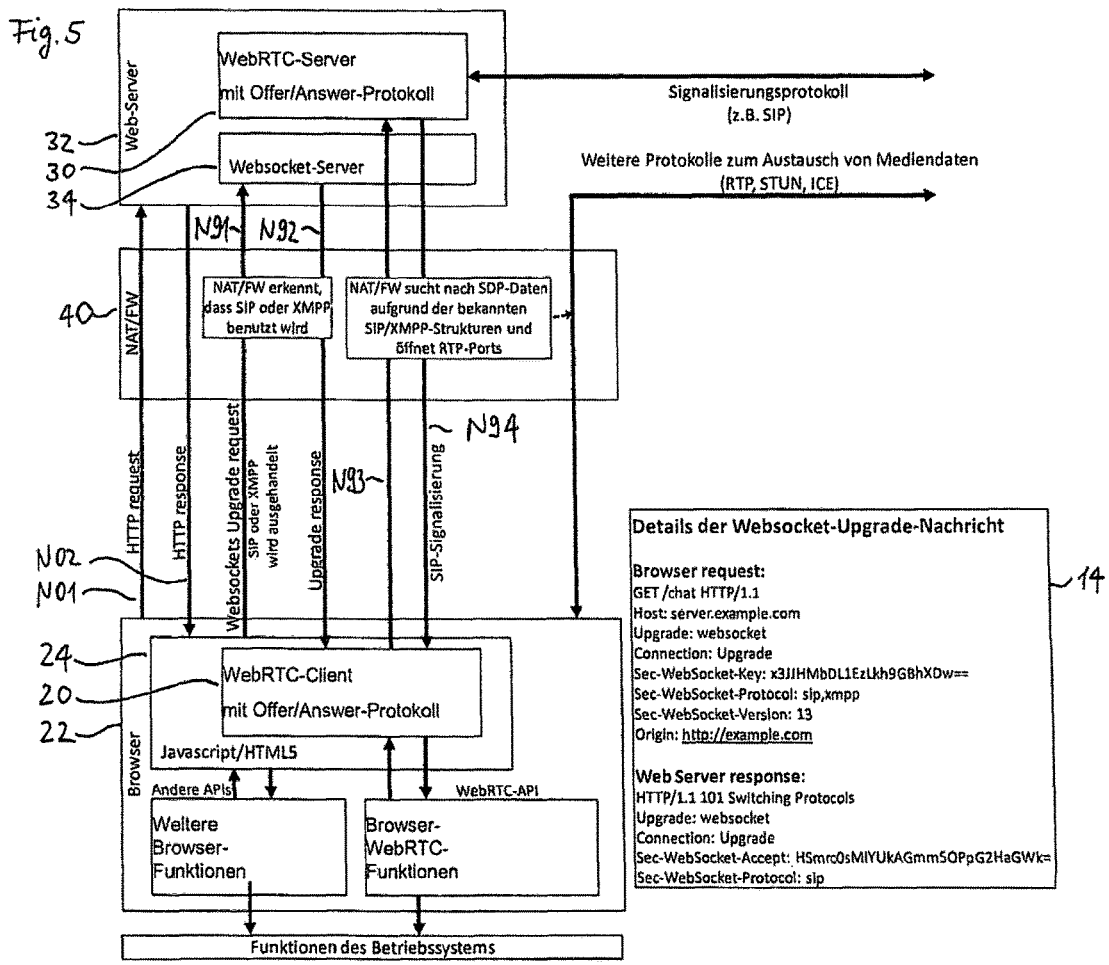

TELECOMMUNICATION SYSTEM AND METHOD FOR TRAVERSING AN APPLICATION LAYER GATEWAY FIREWALL DURING THE ESTABLISHMENT OF AN RTC COMMUNICATION CONNECTION BETWEEN AN RTC CLIENT AND AN RTC SERVER

CROSS-REFERENCE TO RELATED APPLICATIONS

This application is the United States national phase under 35 U.S.C. Section 371, of PCT International Patent Application No. PCT/EP2015/002040, which was filed on Oct. 15, 2015, and claims priority to German application no DE 10 2014 015 443.2, filed on Oct. 21, 2014.

BACKGROUND OF THE INVENTION

Field of the Invention

Embodiments provide systems and methods for traversing an application layer gateway firewall during the establishment of an RTC communication connection between an RTC client and an RTC server. Computer programs and machine-readable data carriers are also provided.

Background of the Related Art

Embodiments reported herein generally concern traversing of an application layer gateway firewall (hereinafter usually referred to in brief as "firewall"), which refers to data packets passing through such a firewall, for example during communication by means of Voice over IP (VoIP) or Video over IP. These types of communication fall under the category of Real-Time Transport Protocol communication (RTP communication). The following description refers but is not limited to a particular application of this RTC communication (RTC=real-time communication), which is WebRTC communication, carried out via a Web browser.

Firewalls are always an obstacle to the transmission of communications via VoIP or Video over IP. This is due to the UDP (User Datagram Protocol) port numbers negotiated dynamically in VoIP standards (H.323, SIP[RFC3261], etc.) for the RTP voice or video packets (RTP=Real-Time Transport Protocol, see [RFC3550]).

With precisely specified standard signaling protocols (H.323/H.245 (H.323 uses H.245 to handle media data), SIP/SDP (Session Initiation Protocol/Session Description Protocol), XMPP/Jingle (Extensible Messaging and Presence Protocol), MGCP (Media Gateway Control Protocol) [RFC3435], etc.), firewall manufacturers can dynamically track signals by implementing certain protocol portions (the signaling portions that are relevant to handling the UDP port numbers). This allows the firewall to open and close the dynamically negotiated UDP ports for the voice-video RTP packets to be transmitted. This known principle is also known as a firewall application layer gateway (=ALG firewall or simply firewall).

Because the signaling protocol for WebRTC is not standardized, any manufacturer can use his own proprietary protocol or alternatively can build on known protocols. Ultimately, however, ALG firewall manufacturers have the problem that they cannot build on a fixed signaling protocol, as would be the case with SIP/SDP, for example, and also cannot inspect it to get the port information in the signaling messages.

For a better understanding, FIG. 5 shows a brief outline of the traversing of an ALG firewall as is currently possible for "SIP over WebSockets." First a browser 22 sends a message N01, "HTTP request," to a Web server 32, which replies to it with a message N02, "HTTP response," on a functional unit 24 (for JavaScript/HTML5), whereby an HTTP connection is established. In an upgrade procedure, or more precisely in message N91, which the WebRTC client 20 on the WebSockets server 34 sends from the HTTP connection to a WebSockets connection as a "WebSockets upgrade request," the use of SIP between the WebRTC client 20 and the WebSockets server 34 is managed. This allows the firewall 40 to recognize that SIP is being used. Here it is also possible, of course, to manage other standardized protocols, such as XMPP (XMPP does not use an SDP, only Jingle. Jingle is the corresponding XMPP expansion that RTC allows), H.323, MGCP. After the WebSockets server 34 receives an upgrade response at message N92, the WebRTC client 20 sends a message N93 on the WebRTC server 30, whereupon the firewall 40 looks for SDP data based on the known SIP/XMPP structures and opens the corresponding RTP ports. This cooperation is acknowledged by a corresponding message N94 with an SDP reply from the WebRTC server 30 on the WebRTC client 20. Next, media data can be exchanged, for which other protocols, such as RTP (real-time protocol), STUN (Session Traversal Utilities for NAT, NAT=Network Address Translation), ICE (Interactive Connectivity Establishment), are used.

The WebSockets protocol optionally includes a field that identifies the signaling protocol used (SIP in this example). This is shown, for example, in an info box 14 under "Browser Request" and "Web Server Response."

The problem with WebRTC in this interchange is that the signaling protocol for WebRTC is not standardized. This means that every WebRTC server must determine how it will handle signaling communication with its WebRTC client. With this proprietary WebRTC signaling approach, it is not possible for firewall manufacturers to produce general ALG firewall solutions for traversing or crossing firewalls, known as WebRTC Traversal. This can lead to problems with generating WebRTC solutions.

WebRTC is relatively new to commercial applications. However, WebRTC is on the way to becoming a dominant technology for Web-based real-time communication.

There are multiple known firewall techniques for WebRTC that are considered for firewall traversal for WebRTC:

a. As for SIP or H.323, certain UDP port ranges in the firewall can also be opened permanently for WebRTC. However, for companies with restrictive security requirements, this is often not desirable.

b. HTTP (Hypertext Transfer Protocol) tunneling: Most firewalls have one port always open. This is the TCP port 80 (TCP=Transmission Control Protocol), through which the HTTP data traffic [see RFC2616] also runs (TCP/http port). The idea is to form a TCP tunnel between the WebRTC client and a TURN server (Traversal Using Relays around NAT, NAT=Network Address Translation, see RFC5766) on the other side of the firewall ("TURN access via TCP") and use it to channel UDP/RTP voice/video packets and data packets through the firewall. Some firewalls/companies are so restrictive that they will not accept HTTP traffic from any client, but instead only that coming from a specific internal server (HTTP proxy). In this case, the WebRTC browser must order the HTTP proxy, using the known HTTP-CONNECT method [RFC2817], to generate the aforementioned TCP tunnel through the firewall, to be used later for the TURN protocol. In another version of this discussion, in IETF, for example, a "TURN over WebSockets" tunnel through the firewall can be used [draft-chenxin-behave-tum-Web-Socket].

This HTTP tunnel solution is basically possible, but requires that several conditions be met for uninterrupted use. It must be established, That the WebRTC client (browser) has implemented the described features (e.g., HTTP CONNECT). This depends upon the browser manufacturer (Google, Microsoft, Mozilla, etc.). For mobile WebRTC clients like smartphones and tablets (native WebRTC app), the method itself must be implemented. the company has and supports the required infrastructure (HTTP proxy), the WebRTC solution provider has installed a TURN server behind the firewall as part of its solution.

c. Firewall/Port Control Protocol [RFC6887] (e.g., Cisco). The idea is that the WebRTC client, before it sends a voice or video packet, gives the firewall a command via its own protocol to open a certain UDP port. Firewall control protocols have been known since around 2003. In practice, however, this approach has not yet succeeded, due among other things to security, authentication, and authorization issues. Most companies (CIOs, IT departments) do not want their firewalls to be "controlled" by multiple clients or servers.

d. Port multiplexing: With this approach, some or all RTP streams for a WebRTC call (e.g., all audio and video streams for a call), or even all RTP streams for multiple or all calls on the same system, can be transmitted through a single UDP port. This approach alleviates the firewall port problem in that fewer port resources are needed, but it does not solve the basic problem of first having to overcome the restrictive firewall. To date, no manufacturer of WebRTC clients or servers supports port multiplexing in conjunction with SIP/XMPP/H.323-based systems (optional). Port multiplexing is particularly an option for WebRTC solution manufacturers with large to very large scaling requirements (e.g., public, residential services, e.g., Google, etc.).

BRIEF SUMMARY OF THE INVENTION

The invention is intended to overcome the aforementioned disadvantages and propose a method for traversing a firewall that both satisfies all security requirements and is easy to manage. The invention is further intended to propose a corresponding telecommunication system with which the method can be implemented.

According to embodiments of the invention, when an RTC communication connection needs to be established, as occurs when a website is opened via an HTTP request, for example, using a proprietary (i.e., not standardized) RTC signaling protocol, the RTC client and the RTC server negotiate which ports of the ALG firewall are needed in order to transmit the data packets required for the RTC communication connection, during which they use at least one standardized message element in the context, i.e., as a component of the proprietary RTC signaling protocol, with which the information concerning the ports to be used can be detected. The firewall has no specific knowledge of the proprietary RTC signaling protocol, and when the RTC communication connection is established using the standardized message element, it learns which of the firewall ports were negotiated by the RTC client and the RTC server, i.e., were found to be necessary in order to transmit the data packets to be exchanged via the RTC communication connection. In other words, the firewall can "overhear" which ports are needed, and that allows the firewall to dynamically open and close the necessary ports depending on the result of the negotiation between RTC client and RTC server.

BRIEF DESCRIPTION OF THE FIGURES

Additional advantages, features, and characteristics of the present invention are presented in the following description of advantageous embodiments with reference to the drawing. The figures show schematically.

DETAILED DESCRIPTION OF THE INVENTION

Figure 1:
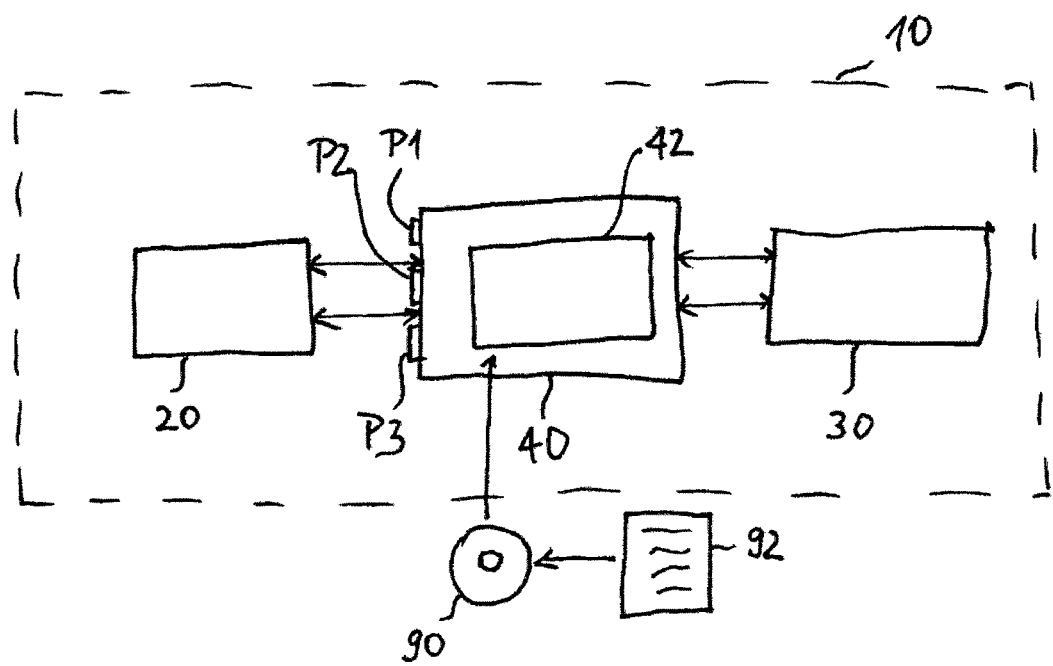
FIG. 1 a schematic overview of one embodiment of a telecommunication system according to the invention, FIGS. 2-4 schematic implementation plans for three embodiments of the invented method for traversing a firewall, and FIG. 5 a schematic implementation plan for an already known method for traversing a firewall.

As noted above, According to embodiments of the invention, when an RTC communication connection needs to be established, as occurs when a website is opened via an HTTP request, for example, using a proprietary (i.e., not standardized) RTC signaling protocol, the RTC client and the RTC server negotiate which ports of the ALG firewall are needed in order to transmit the data packets required for the RTC communication connection, during which they use at least one standardized message element in the context, i.e., as a component of the proprietary RTC signaling protocol, with which the information concerning the ports to be used can be detected. The firewall has no specific knowledge of the proprietary RTC signaling protocol, and when the RTC communication connection is established using the standardized message element, it learns which of the firewall ports were negotiated by the RTC client and the RTC server, i.e., were found to be necessary in order to transmit the data packets to be exchanged via the RTC communication connection. In other words, the firewall can "overhear" which ports are needed, and that allows the firewall to dynamically open and close the necessary ports depending on the result of the negotiation between RTC client and RTC server.

A message element in a communication protocol is a syntactic segment of one or more signaling messages in which a piece of information is coded for later interpretation in network components and/or communication network terminals as part of a switching process. Message elements can be standardized elements or manufacturer-specific (proprietary) elements; the latter are not essential for basic functions of the communication network and are usually ignored by other manufacturers' network components and/or terminals. The standardized message element according to the invention contains identifying information about the connections established in order to transmit media data from and to a terminal and therefore must pass through the firewall, e.g., through open ports, in both sending and receiving directions.

Additional explanations of such message elements can be found in EP 1 317 150 A2.

In other words, the invented method solves the basic problem by using an add-on as a component of the RTC signaling channel that allows the firewall to overhear, during establishment of the RTC connection, which ports or UDP ports are dynamically negotiated for the exchange of voice and/or video packets, and therefore to dynamically open and close the corresponding UDP ports for the RTP traffic. The aforementioned context can be generated during the creation of the RTC signaling channel, during RTC signaling, or at the end of RTC signaling in the form of an additional field that contains information used for later detection of the RTP ports in the signaling messages. The establishment or standardization of an add-on that defines the context for the RTC signaling portion, which when read by a firewall is adequate to allow UDP/RTP port control, i.e., opening and closing, is also designated in the following as WebRTC signaling or briefly as WebRTCSig.

Embodiments as reported herein may offer multiple advantages:

Firewall control protocols, which would represent significant obstacles with respect to security requirements, do not have to be implemented;

no ports or ranges of ports have to be kept permanently open in the firewall, which could be risky for security reasons. It should be noted here that the use of port multiplexing techniques, with which multiple or all UDP streams are sent through a single UDP port, will presumably be supported in the future primarily by manufacturers of large-scale solutions.

in scenarios where a solution based on HTTP tunneling cannot be applied, the invented method is relatively simple and yet more secure than other alternatives that can require significant expansion of WebRTC; by using this invention, for example, firewall solutions can be implemented that provide a continuous solution in particular for certain WebRTC applications.

the invented solution can also be standardized easily, for example with IETF, so that generic implementation is possible and open to all manufacturers of WebRTC-based solutions and WebRTC firewalls.

For the use of the Secure WebSockets Protocol (WSS)—i.e., a WebSockets connection with TLS (Transport Layer Security)—the firewall cannot easily read the higher WebRTC signaling portion contained in the WSS connection, and for this problem, for example, a TLS hop-by-hop context can be used as the solution, as is done for session border controllers (SBCs). The ALG firewall terminates TLS, i.e., encryption takes place only up to or beginning at the firewall. TLS is only hop-by-hop. The ALG firewall therefore has one TLS connection first to the WebRTC client (or proxy) on one side of the ALG firewall and another TLS connection with the WebRTC server (or access node) on the other side of the ALG firewall.

According to one preferred embodiment of the invention, for negotiating the required ports, i.e., for exchanging the RTC signaling information and parameters between the RTC client and the RTC server, a previously defined (randomly numbered) signaling type is used, that is exchanged after the initial establishment of an HTTP connection between the RTC client and the RTC server by means of a so-called "WebRTCSig handshake." This presents the advantageous development that the WebRTCSig handshake is executed as part of a procedure to upgrade an HTTP connection to a WebSockets connection and generates a context for RTC signaling. Expansions to the WebSockets protocol are sometimes necessary for this, for which a special or defined—and usually additional—field is inserted in a header, for example. Alternatively, the WebRTCSig handshake can take place only after the HTTP connection is converted (or upgraded) to a WebSockets connection, which is done by a proprietary protocol that preferably comprises only a few additional bytes and is also known as a "thin layer protocol" or "WebRTCSig over WebSockets." With respect to the second WebRTCSig handshake alternative occurring only after the upgrade procedure, the first WebRTCSig handshake alternative offers the advantage, as part of the upgrade procedure, of saving the time needed for a round trip. Regarding the precise scheduling or timing, the WebRTCSig handshake takes place, for example, after the RTC client has downloaded the Java script (JS client) from the RTC server.

Depending on the RTC signaling protocol used, the actual WebRTCSig information can include the following signaling protocol variations:

1) WebRTCSig type 1=SIP and SDP over WebSockets
2) WebRTCSig type 2=XMPP and Jingle over WebSockets
3) WebRTCSig type 3="Proprietary WebSockets Signaling with SDP Embedded (Offset)"

i.e., WS signaling messages (WS=WebSockets) with SDP protocol messages (e.g., WS Setup with SDP Offer; WS Connect with SDP Answer). This allows the firewall to find the beginning of the SDP Offer/Answer message, and an offset value can/must be provided here, that addresses the beginning of the SDP Offer message.

It should be noted that SDP is used here as session signaling for two reasons:

a) The WebRTC browser API (standardized in W3C=World Wide Web Consortium) is SDP-based in version 1.

b) SDP is also the session description protocol in SIP.

The offer-answer model is described in RFC 3264 as an example of a standardized message element, with the line "m=video 53000 RTP/AVP 32", which means that video should be transmitted via port 53000.

SDP thereby facilitates cooperation with the SIP environment and also client-side cooperation between session signaling and WebRTC-API.

If a manufacturer uses a proprietary signaling protocol, it most probably uses SDP with the proprietary messages nonetheless, because WebRTC-API also uses SDP. With the invented WebRTCSig type 3, for example, the signal would also indicate, as additional information, that the ALG firewall should start by byte 77 and should be interpreted as SDP protocol (again because that is standardized). Everything before that, i.e., up to and including byte 76, is part of the "proprietary setup message."

Alternatively, the browser could also map the SDP of the WebRTC-API to something else—e.g., H.245, Jingle, or a proprietary format—and use RTC signaling. It would then be flagged by another WebRTCSig type. This variation corresponds to a preferred embodiment of the invented method, according to which a signaling protocol with a signaling message is used, in which a session description protocol offer message with embedded offset is used, wherein the offset addresses the beginning of that message.

4) WebRTCSig type 4=specific SDP protocol

The SDP protocol could be standardized specifically for WebRTC.

5) WebRTCSig type 5=negotiated ports with pre-defined and communication syntax according to the invention 6) WebRTCSig type 6=negotiated ports in RESTful style (REST=Representational State Transfer): known URI (Uniform Resource Identifier) with defined (sub-)structure, which contains the ports.

7) WebRTCSig type 7=negotiated ports in RESTful style: known URI with a pointer or indicator that indicates a resource (server) that is supposed to contain the ports.

These last two variations also correspond to a preferred embodiment of the invented method, according to which the negotiated ports are defined in the RESTful style in RTC signaling messages.

8) WebRTCSig type 8=a text string is entered as the parameter that designates the start of SDP in the signaling messages. The text string as such is optional; it should not recur anywhere in the rest of the message.

Further embodiments may provide a telecommunication system that includes at least one RTC client, at least one RTC server, and at least one firewall with multiple ports. According to an embodiment of the invention, the firewall has a control unit that is configured such that the previously described method can be implemented.

In addition, a computer program product for executing the previously described method, and a machine-readable data carrier on which such a computer program product is stored, are possible embodiments.

As it is currently understood, IETF will not standardize the entire WebRTC signaling protocol, as was done for SIP or H.323, for example. An ALG firewall must therefore implement the WebRTC signaling protocols of all WebRTC application manufacturers, if the signaling protocol needs to be understood dynamically in all environments in order to find the negotiated UDP ports to which the proprietary RTP packets are sent. This can be avoided by grouping the chosen signaling protocols into categories (randomly numbered, for example). If the ALG firewall determines or learns that WebRTC signaling type 1 is involved, then it knows that it must parse according to SIP/SDP. On the other hand, if the ALG firewall learns that WebRTC signaling type 3 with offset 77 is being used, then the ALG firewall knows that it must parse the message from byte 77 as SDP protocol, etc. WebRTC signaling type 4 would then be an SDP protocol from byte 1. WebRTC signaling type 5 plus specific source and destination UDP port instructions would inform the ALG firewall of the exact UDP ports, so in this case no SDP protocol is used.

The telecommunication system 10 according to this invention shown in FIG. 1 comprises an RTC client 20, an RTC server 30, and a firewall 40. The exchange of messages between the firewall 40 with the client 20 on one side and the server 30 on the other side is symbolized by a few arrows. It is also schematically shown that the firewall 40 has multiple ports that are designated only schematically as P1, P2, and P3. The firewall 40 includes a control unit 42, such as a CPU or a processor group, that implements the functions of the firewall 40. A CD-ROM 90 is also schematically shown as an example of a data carrier on which the computer program or computer program product 92 is stored, wherein the data carrier 90 with the corresponding computer program 92 is made available to the control unit 42 in order to implement the invented method.

FIG. 2 shows a first embodiment of the invented method for traversing a firewall, with which RTC signaling type 3 is implemented as in the previous explanation. First a browser 22 sends a message N01, "HTTP request," to a Web server 32, which replies to it with a message N02, "HTTP response," on a functional unit 24 (for JavaScript/HTML5), whereby an HTTP connection is established. Next, as part of a WebSockets upgrade procedure, the functional unit 24 sends a corresponding message N11 to a WebSockets server 34 in the Web server 32, wherein the message N11 contains the WebRTC signaling type and an SDP_offset marker. The WebSockets server 34 confirms the upgrade procedure to the WebRTC client 20 with a message N12. Then the WebRTC client 20 sends the WebRTC server a message N13 containing the information that the signaling message starts with an SDP offset of 255. The firewall 40 therefore finds the SDP at byte 255. In a corresponding message N14 from the WebRTC server 30 on the WebRTC client 20—both of which use an offer/answer protocol—a signaling is completed by an SDP_offset marker. With this type of signaling the firewall 40 can "read" where to find the information relevant to it (here starting with byte 255). This information is transferred to a new header field, in which the type and SDP_offset are indicated, as noted in an info box 11 as the last line under the heading "Browser Request." As shown in the info box 11 in the last line under the heading "Web server response," the WebRTC server 30 for the WebRTC client 20 confirms that the negotiated signaling type is No. 3, and indicates with "OK" that signaling is using the negotiated SDP_offset marker.

The remaining designations shown in FIG. 2 correspond to the usual designations in this technical field and need no particular explanation.

After successful completion of the signaling, media data can be transmitted through the firewall 40, for which other protocols, such as RTP (real-time protocol), STUN (Session Traversal Utilities for NAT, NAT=Network Address Translation), ICE (Interactive Connectivity Establishment), are used.

As previously explained, according to the invention the type of WebRTC signaling is transmitted (this example uses the—randomly selected—type No. 3), and at the position of the SDP_offset designation there is a text string that marks an indicator or pointer for the SDP in the signaling message. The text string as such is optional; it should not recur anywhere in the rest of the message. Instead of the "SDP offset" designation given in the example, any string of adequate length, for example, could satisfy this requirement.

A second embodiment of the invented method, shown in FIG. 3, differs from the first embodiment in that, during the upgrade procedure to the WebSockets connection, another signaling type (in this example: 5) and the port values that should open the firewall 40, are transmitted with messages N21 and N22. In other words, the signaling message n23 contains the components that are designated in this example as "Open_Ports: 62255, 62256, 31234, 31235," and a confirmation message N24 ensues. In response, the firewall 40 opens the corresponding ports. Accordingly, the signaling type No. 5 and the instruction "Open_Ports" are entered in the new header field. In the last position there is a text string that marks the RTP ports for the media in the signaling messages. The text string as such is entirely optional, but it should not recur anywhere in the rest of the message. Instead of the "Open_Ports" example given in the info box 12 as the last line under the heading "Browser Request," any string of adequate length, for example, could also satisfy this requirement. Similarly, the response from the WebRTC server 30 to the WebRTC client 20 contains the confirmation of the negotiated signaling type No. 5 as well as an (optional) confirmation that the ports were opened (see also info box 12). Signaling with the port values is thereby carried out.

A third embodiment of the invented method, shown in FIG. 4, differs from the previous two in that, during the upgrade procedure to the WebSockets connection, another WebRTC signaling type, here No. 8, as well as a text string that marks the start of SDP in the signaling messages N33 and N34, are transmitted with messages N31 and N32. This allows the firewall 40 to recognize that an unknown protocol with embedded SDP is being used and to look for the text string "Here_starts_SDP" and open the RTP ports that were contained in the SDP. As a result, in the newly created header field, No. 8 is identified as the signaling type and the text string "Here_starts_SDP" is contained in the "Browser Request" according to info box 13. The corresponding response from the WebRTC server 30 to the WebRTC client

20 therefore also contains (in the message N34) the agreed signaling type 8 as well as the confirmation that signaling is being carried out with the SDP_Start_String. Instead of the "Here_starts_SDP" text string shown in the example, any other string of adequate length could also be used, as long as it does not recur in the rest of the message.

It should be noted that the features of the invention described by referencing the presented embodiments, for example the type and configuration of the clients, server, connections, and protocols used, can also be present in other embodiments, unless stated otherwise or prohibited for technical reasons. Not all features of individual embodiments described in combination must necessarily always be implemented in any one particular embodiment.

We claim:

1. A method for traversing an application layer gateway (ALG) firewall during establishment of a real-time communication (RTC) communication connection between an RTC client and an RTC server using a proprietary RTC signaling protocol, wherein the firewall has no specific knowledge of the proprietary RTC signaling protocol, comprising:
   the RTC client and the RTC server negotiating, during establishment of the RTC communication connection, which ports of the ALG firewall are required for data packets to be exchanged via the RTC communication connection, the RTC client and the RTC server using at least one standardized message element of the proprietary RTC signaling protocol to include items of information relating to the ports during the negotiating so that the ALG firewall, during establishment of the RTC communication connection, detects which of the ports of the ALG firewall were negotiated as required for the data packets to be exchanged between the RTC server and the RTC client via the RTC communication connection for opening and closing the ports of the ALG firewall even though the ALG firewall has no specific knowledge of the proprietary RTC signaling protocol, wherein exchanging of signaling protocol variations takes place as part of an upgrade procedure from a Hypertext Transfer Protocol (HTTP) connection to a WebSockets connection;
   the ALG firewall dynamically opening and closing the ports for the RTC communication connection in response to detection of the ports of the ALG firewall that were negotiated as required for the data packets to be exchanged between the RTC server and the RTC client via the at least one standardized message element of the proprietary RTC signaling protocol utilized by the RTC client and the RTC server during the negotiating.

2. The method of claim 1, wherein a defined signaling protocol variation is used for negotiating the necessary ports, the method further comprising exchanging the defined signaling protocol variation via RTC signaling after a signaling-transport connection is established between the RTC client and the RTC server.

3. The method of claim 1, wherein the exchange of signaling protocol variations occurs through a defined field in a header of an add-on in a WebSockets protocol.

4. The method of claim 1, wherein the exchange of signaling protocol variations takes place using a proprietary protocol.

5. The method of claim 1, comprising:
   the RTC client and the RTC server establishing a Hypertext Transfer Protocol (HTTP) connection and subsequently adjusting the HTTP connection to a Web Sockets connection prior to negotiating the ports of the firewall needed for transmission of the data packets.

6. The method of claim 5, comprising:
   the RTC client downloading javascript data from the RTC server before adjustment of the HTTP connection to the Web Sockets connection occurs.

7. The method of claim 6, wherein the data packets are media data packets.

8. The method of claim 7, wherein the media data packets are for voice over internet protocol (VoIP) or video over IP.

9. The method of claim 7, wherein the adjusting the HTTP connection to the Web Sockets connection prior to negotiating the ports of the firewall needed for transmission of the data packets includes use of a WebRTCSig handshake to adjust the HTTP connection to the Web Sockets connection.

10. A non-transitory computer readable medium having a computer program stored thereon, the computer program defining a method configured to facilitate establishment of a real-time communication (RTC) connection between an RTC client and an RTC server in which a application layer gateway (ALG) firewall has no knowledge of a proprietary RTC signaling protocol usable by the RTC client and the RTC server to exchange proprietary RTC signaling to negotiate which ports of the ALG firewall are needed for data packets to be exchanged via the RTC communication connection, the proprietary RTC signaling having at least one standardized message element, wherein exchanging of signaling protocol variations takes place as part of an upgrade procedure from a Hypertext Transfer Protocol (HTTP) connection to a WebSockets connection, the method comprising:
   the ALG firewall dynamically opening and closing the ports for the RTC communication connection in response to detection of the ports of the ALG firewall that were negotiated as required for the data packets to be exchanged between the RTC server and the RTC client via the at least one standardized message element of the proprietary RTC signaling protocol utilized by the RTC client and the RTC server during the negotiating.

11. A telecommunication system for traversing an application layer gateway firewall during the establishment of a real-time communication (RTC) connection between an RTC client and an RTC server using a proprietary RTC signaling protocol, wherein the firewall has no specific knowledge of the proprietary RTC signaling protocol, comprising:
   an RTC client,
   an RTC server, and
   a firewall with multiple ports and comprising hardware, the hardware comprising a non-transitory computer readable medium,
   wherein the firewall has a control device for facilitating performance of a method, the method comprising:
      the RTC client and the RTC server negotiating, during establishment of the RTC communication connection, which ports of the ALG firewall are required for data packets to be exchanged via the RTC communication connection, the RTC client and the RTC server using at least one standardized message element of the proprietary RTC signaling protocol to include items of information relating to the ports during the negotiating so that the ALG firewall, during establishment of the RTC communication connection, detects which of the ports of the ALG firewall were negotiated as required for the data packets to be exchanged between the RTC server and the RTC client via the RTC communication connection for opening and closing the ports of the ALG firewall even though the ALG firewall has no specific knowledge of the proprietary RTC signaling protocol, wherein exchanging of signaling protocol variations takes place as part of an upgrade procedure from a Hypertext Transfer Protocol (HTTP) connection to a WebSockets connection;

the ALG firewall dynamically opening and closing the ports for the RTC communication connection in response to detection of the ports of the ALG firewall that were negotiated as required for the data packets to be exchanged between the RTC server and the RTC client via the at least one standardized message element of the proprietary RTC signaling protocol utilized by the RTC client and the RTC server during the negotiating.

12. A communication apparatus comprising:

an application layer gateway (ALG) firewall comprising a processor connected to a non-transitory computer readable medium, the ALG firewall configured to establish a real-time communication (RTC) connection between an RTC client and an RTC server; the ALG firewall having no knowledge of a proprietary RTC signaling protocol usable by the RTC client and the RTC server to exchange proprietary RTC signaling to negotiate which ports of the ALG firewall are needed for data packets to be exchanged via the RTC communication connection, the proprietary RTC signaling having at least one standardized message element, wherein exchanging of signaling protocol variations takes place as part of an upgrade procedure from a Hypertext Transfer Protocol (HTTP) connection to a WebSockets connection;

the ALG firewall configured to utilize the at least one standardized message element of the proprietary RTC signaling exchanged between the RTC client and the RTC server to negotiate the ports needed for exchanging data packets during establishment of the RTC communication connection to detect which of the ports of the ALG firewall are negotiated as required for the data packets to be exchanged between the RTC server and the RTC client via the RTC communication connection and dynamically opening and closing the ports of the ALG firewall in response to detection of the ports via the at least one standardized message element of the proprietary RTC signaling exchanged between the RTC client and the RTC server during establishment of the RTC communication connection even though the ALG firewall has no specific knowledge of the proprietary RTC signaling protocol.

13. The communication apparatus of claim 12, comprising:

the RTC client or the RTC server.

14. The communication apparatus of claim 12, comprising:

the RTC client and the RTC server.

15. The communication apparatus of claim 14, wherein the data packets to be exchanged via the RTC communication connection are media data packets and the RTC client is a webRTC client.

16. The communication apparatus of claim 14, wherein the RTC client and the RTC server are configured to establish a Hypertext Transfer Protocol (HTTP) connection and subsequently adjust the HTTP connection to a Web Sockets connection prior to negotiating the ports of the firewall needed for transmission of the data packets.

17. The communication apparatus of claim 16, wherein subsequent adjustment of the HTTP connection to the Web Sockets connection occurs after the RTC client downloads javascript data from the RTC server.

18. The communication apparatus of claim 17, wherein the ports are user datagram protocol (UDP) ports.

* * * * *